Oct. 21, 1941.  P. P. MIKOLAJCZAK  2,259,652
FILLER CAP LOCK
Filed Nov. 5, 1940
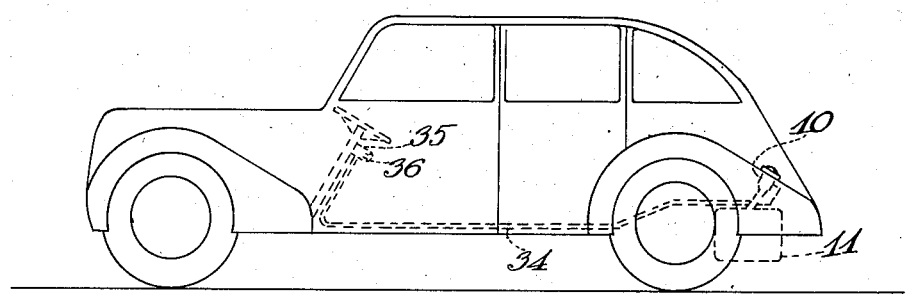
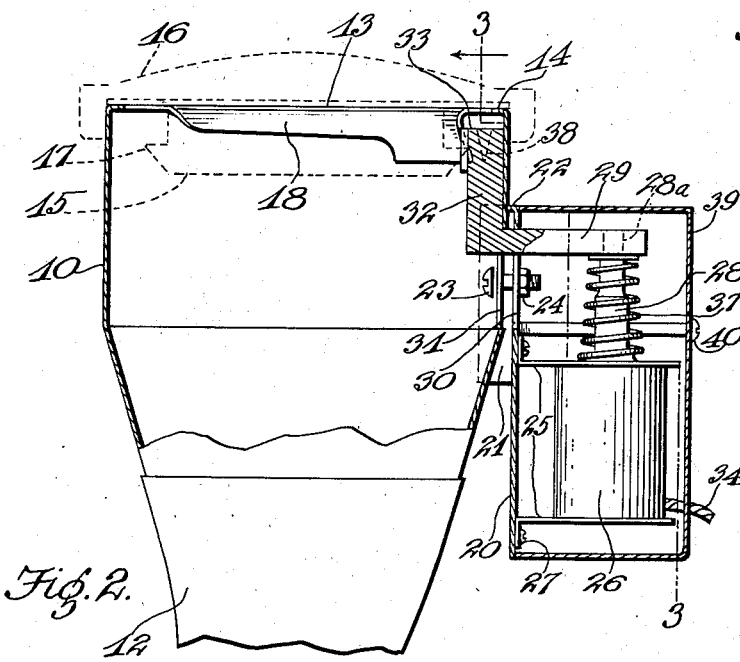
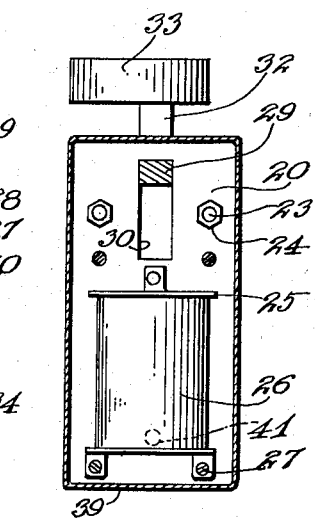
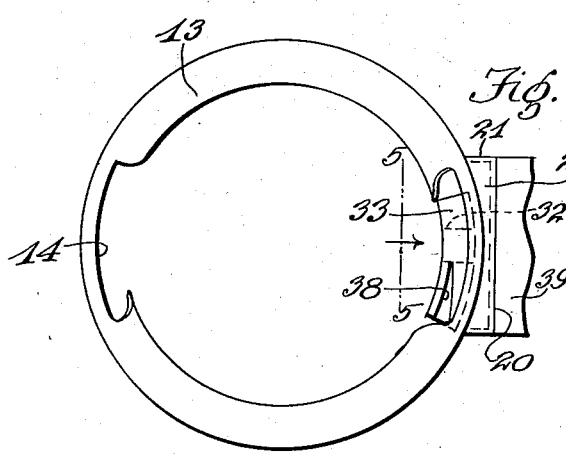
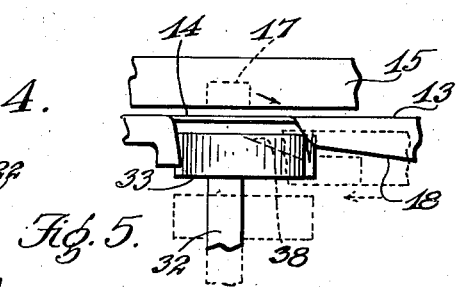
Peter P. Mikolajczak
INVENTOR.
BY Milo B. Stevens & Co.
ATTORNEYS.

Patented Oct. 21, 1941

2,259,652

UNITED STATES PATENT OFFICE 2,259,652

FILLER CAP LOCK

Peter P. Mikolajczak, Chicago, Ill.

Application November 5, 1940, Serial No. 364,467

2 Claims. (Cl. 292—144)

My invention relates to the filler caps of automobile tanks, and more particularly to means for locking such caps to prevent the theft of fuel.

While special caps have been devised which can be locked by means of a key or other control, it is apparent that not many car owners care to go to the bother or expense of a special cap, or to be concerned about keeping or using a key for the same. It is therefore one of my objects to provide a locking device which employs the standard cap and does not require the use of a key.

A further object of the invention is to provide a mechanism which is controllable from the driver's compartment and therefore inaccessible to unauthorized persons when the car is locked.

Another object of the invention is to devise a mechanism which only requires a control to release the filler cap and no operation to lock the same when it has been replaced other than the usual closing turn.

An additional object of the invention is to design the mechanism for the novel lock as a unit closely associated with the filler neck of the fuel tank in a position to be entirely invisible.

An important object of the invention is to construct the novel lock with mechanical and electrical values which function along standard and well established principles, whereby to make the lock dependable and efficient.

With the above objects in view and any others which may suggest themselves from the description to follow, a better understanding of the invention may be had by reference to the accompanying drawing, in which—

Fig. 1 is an elevation of a motor-car showing the novel lock installed;

Fig. 2 is an enlarged section of the lock as applied to the filler neck and showing the filler cap by means of dotted lines;

Fig. 3 is a section of the lock as taken on the line 3—3 of Fig. 2;

Fig. 4 is a top plan view of the filler neck, showing the application of the lock; and Fig. 5 is a section taken on the line 5—5 of Fig. 4.

Referring specifically to the drawing, 10 denotes the filler neck applying to a standard automobile fuel tank 11 directly or by way of a flexible conduit 12. Insofar as the present invention is concerned, only the upper portion of the filler neck is involved.

The conventional filler neck has a top inward flange 13 interrupted by reduced flanges 14 on opposite sides for the insertion of the stem 15 depending from the filler cap 16 in a manner to project oppositely positioned lugs 17 into the cavities formed by the reduced flanges 14. When the cap 16 is given a right-hand turn, the lugs 17 climb cam skirts 18 formed along the inner sides of the flanges 13, with the result that the cap is drawn downwardly to make a tight fit upon the filler neck. To remove the cap, the same is turned in the opposite direction until the lugs 17 again enter the recesses formed by the flanges 14, so that with these clearing the lugs the cap may be lifted off the filler neck. It is my purpose to place the effective portion of the novel lock in a manner to form a barrier in one of the recesses mentioned, so that the return rotation of the cap will stop before the lugs 17 reach the clearance zones, thus preventing the cap from being lifted off.

In accordance with the object just outlined, the novel lock primarily involves a wall plate 20 which is formed with sides 21 and a top 22 to fit around the filler neck 10, laterally spaced screws 23 being directed from the inside of the latter to pass through the wall plate and receive securing nuts 24 therefor.

The wall plate 20 has outward brackets 25 forming the top and bottom of a solenoid 26, the brackets being secured to the wall plate by screws 27.

The armature 28 of the solenoid 26 extends upwardly and has a final reduction 28a which is driven into a horizontal bar 29. The bar extends into the filler neck by way of a slot 30 in the wall plate 20 and a similar slot 31 in the filler neck. The bar is extended upwardly inside the filler neck with a shank 32 which terminates with a transverse enlargement or bolt 33.

The solenoid, armature, bar 29, shank 32 and the bolt 33 are a single unit, and full lines indicate the uppermost position of this unit or the locked position of the bolt. The slots 30 and 31 extend downwardly to a sufficient extent to permit the descent of the unit to a suitable extent representative of the unlocked position of the bolt, such position being indicated by finely-dotted lines in Fig. 5.

The shank 32 and bolt 33 lie closely along the inside of the filler neck wall and are intended to slide vertically along the same. The bolt necessarily has a segmental curvature to fit the filler neck wall, such curvature being indicated in Fig. 4.

When the bolt 33 is in the uppermost or locking position, it fills the recess of the corresponding flange 14 at the proper height to block the return of the related filler cap lug 17, as suggested by the finely-dotted lines and arrow in Fig. 5. However, when the bolt unit is lowered to the extent previously mentioned, the clearance is afforded for the completed travel of the filler cap lug and the consequent release of the cap. The lowering of the locking unit is accomplished at will by a control for the solenoid. Thus, the circuit for the same is represented by a conductor cord 34 which leads to a position under the steering wheel—or on the dash—of the driver's compartment, to terminate with a switch box 35 operated by a button 36. Thus, pressing the button will unlock the filler cap.

The solenoid armature is encircled by a compression spring 37 which bears on the bar 39 to raise the same when the solenoid is de-energized. Thus, the button 36 need only be pressed until the filler cap has been removed, and then released, this action permitting the spring 37 to restore the bolt 33 to the locking position.

When the filler cap is to be replaced, it is not necessary to again energize the solenoid, the mere application of the cap with a closing movement sufficing to restore it to locked condition. This action may be understood from Fig. 5. Here a fragment of the filler cap stem 15 is shown by means of full lines, dotted lines in such illustration representing the cap lug 17 on the remote side of the stem. Thus, the replacing movement of the filler cap is in the general direction of the full-line arrow, so that the lug 17 bears down on the bolt 33 as the filler cap is lowered and trips the bolt, the cap stem and lug appearing per dotted lines in the right-hand portion of Fig. 5 as the lug trips the bolt. In order that the bolt may always return to its top limit and present an ample barrier to the returning lug when an unauthorized attempt to remove the cap occurs, the top of the bolt is made with an inclined groove 38 to clear the initial portion of the cam skirt 18.

In order that the major parts of the lock beyond the filler cap may be protected from dust or injury, the wall plate 20 receives a light housing 39 from the outer side, bolts 40 being directed from the housing to screw into the wall plate and secure the housing to the same. The housing is closed, except for an opening 41 in its outer wall for the passage of the conductor cord 34.

It will be evident from the above description that I have provided a lock for the purpose specified which not only accomplishes the objects outlined, but also forms a small, compact and easily attachable unit, it only being necessary to cut the slot 31 and to drill the holes in the wall of the filler neck for the bolts 23. Of course, where the lock is provided as standard equipment, these considerations are negligible, since the filler cap will be formed to suit. However, the alterations to the filler cap are easy of accomplishment at any garage or service station, whereby to make the lock available to car owners as well as to those intending to buy new cars. Finally, it will be appreciated that the present lock is entirely inconspicuous and very convenient to control.

While I have described the invention along specific lines, various minor changes and refinements may be made without departing from its principle, and I desire to consider all such changes and refinements as coming within the scope and spirit of the appended claims.

I claim:

1. A lock for the filler neck of a fuel tank which includes an inwardly directed flange, at least one recess formed through said flange, a depending cam on said flange adjacent said recess, a closure cap including a lug insertable into the filler neck through said recess and engageable with said cam to lock the cap to the filler neck when the cap is rotated in a locking direction; a lock for said cap, said lock comprising a member normally filling the recess to form a barrier to said lug upon return rotation of said cap, said member being automatically retracted in a downward direction by said lug when said cap is applied to said filler neck to permit rotation of the cap in a locking direction, means thereafter automatically returning said member to its recess closing position to bar return rotation of said cap, operator controlled means for retracting said member to permit return rotation of said cap, and a portion of said member interengaging with an initial portion of said cam when said member is in its recess closing position.

2. A lock for the filler neck of a fuel tank which includes an inwardly directed flange, at least one recess formed through said flange, a depending cam on said flange adjacent said recess, a closure cap including a lug insertable into the filler neck through said recess and engageable with said cam to lock the cap to the filler neck when the cap is rotated in a locking direction; a lock for said cap, said lock comprising a member normally filling the recess to form a barrier to said lug upon return rotation of said cap, said member being automatically retracted in a downward direction by said lug when said cap is applied to the filler neck to permit rotation of the cap in a locking direction, means thereafter automatically returning said member to its recess closing position to bar return rotation of the cap, operator controlled means for retracting said member to permit return rotation of the cap, a groove in an upper surface of said member, and an initial portion of said cam being received in said groove when said member is in its recess closing position.

PETER P. MIKOLAJCZAK.